United States Patent
Otterson

(10) Patent No.: US 6,317,229 B1
(45) Date of Patent: Nov. 13, 2001

(54) ADJUSTABLE MIRROR

(76) Inventor: Randall Frederick Otterson, RR #6, West North River Road, Truro, Nova Scotia (CA), B2N 5B4

( * ) Notice: Subject to any disclaimer, the term of this patent is extended or adjusted under 35 U.S.C. 154(b) by 0 days.

(21) Appl. No.: 09/680,962

(22) Filed: Oct. 6, 2000

(51) Int. Cl.[7] .................................................. G02B 7/182
(52) U.S. Cl. .............................................................. 359/87
(58) Field of Search ..................................... 359/871, 872, 359/873, 874, 877, 878, 850, 851, 223, 224, 846, 847, 848, 849

(56) References Cited

U.S. PATENT DOCUMENTS

| 4,119,366 | 10/1978 | Lemaitre . | |
|---|---|---|---|
| 4,280,753 | 7/1981 | Neubauer . | |
| 4,288,146 | * 9/1981 | Johnson, Jr. et al. | ................ 359/871 |
| 4,575,200 | 3/1986 | Humiston . | |
| 4,952,005 | 8/1990 | Hamiade et al. . | |
| 5,109,300 | * 4/1992 | Waddell | ................................ 359/847 |
| 5,673,153 | * 9/1997 | Soll et al. | ............................. 359/846 |
| 5,835,292 | 11/1998 | Pickett et al. . | |
| 5,862,003 | * 1/1999 | Saif et al. | ............................. 359/871 |
| 5,986,795 | * 11/1999 | Chapman et al. | ................... 359/224 |

* cited by examiner

Primary Examiner—Mohammad Sikder
(74) Attorney, Agent, or Firm—Sughrue, Mion, Zinn, Macpeak & Seas, PLLC

(57) ABSTRACT

An adjustable mirror device comprises a flexible mirror element mounted in a frame. The frame has a back plate normally parallel to the flexible mirror element and a handle extending from the bottom of the frame. Adjustment elements are located between the flexible mirror element and the back plate and are operatively connected to control means normally located at the junction of the handle to the frame. Actuation of the control means causes concomitant lateral movement of the associated adjustment element to flex or relax a portion of the mirror element so as to vary the contour thereof and hence an image received therefrom to achieve a modified or distorted image of a person viewing their image in the adjustable mirror device.

12 Claims, 5 Drawing Sheets

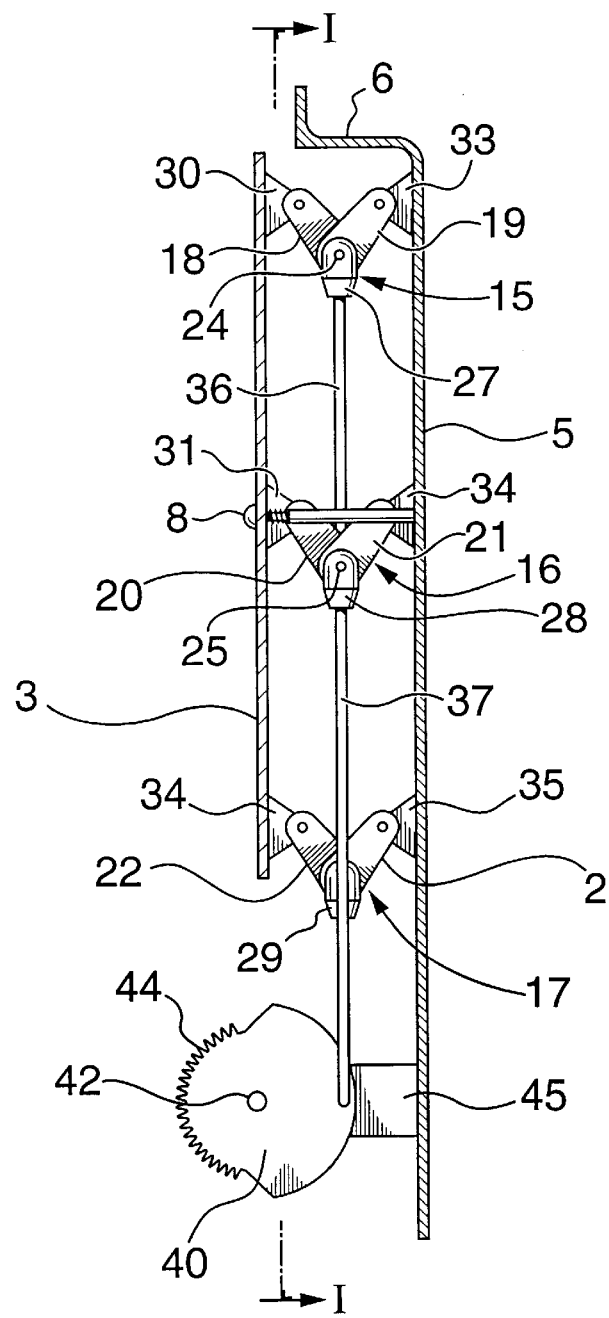
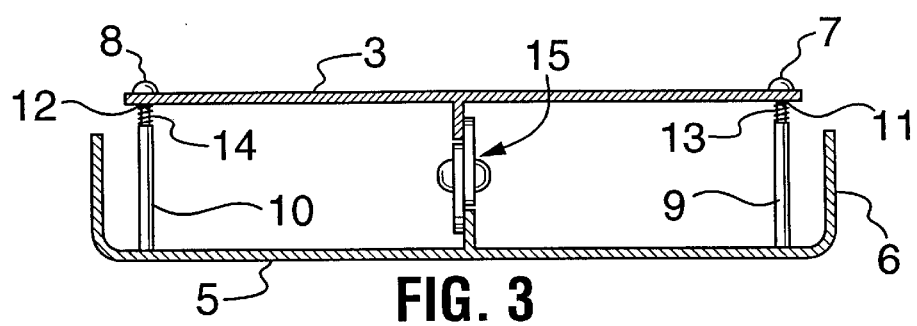
FIG. 2
FIG. 3

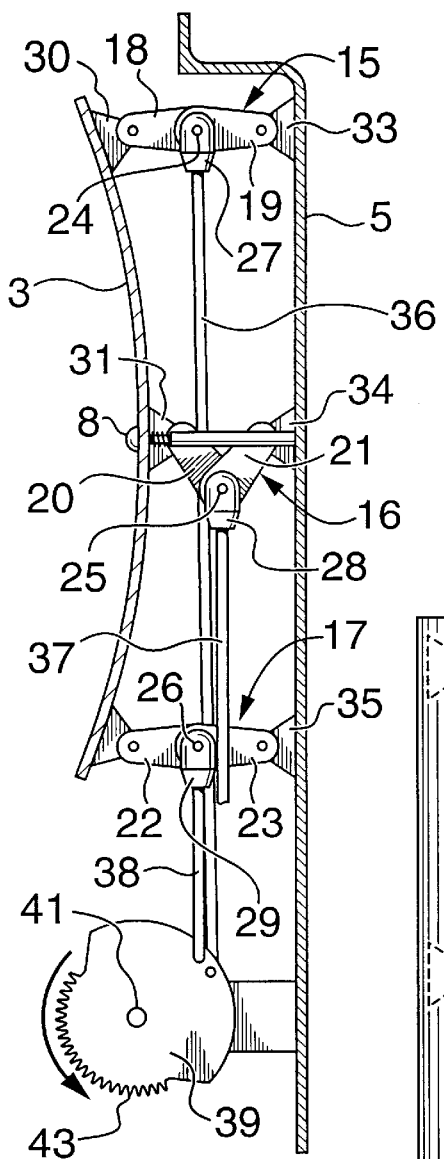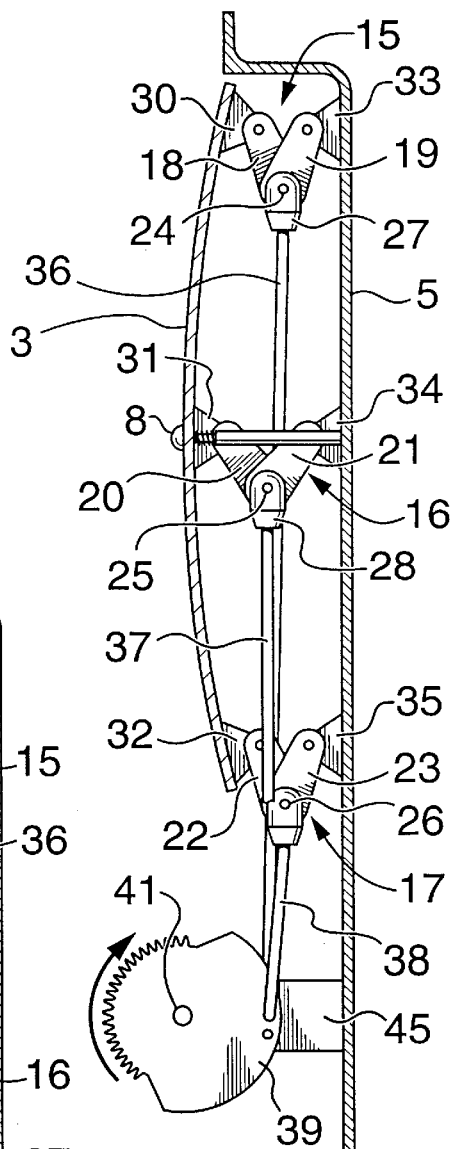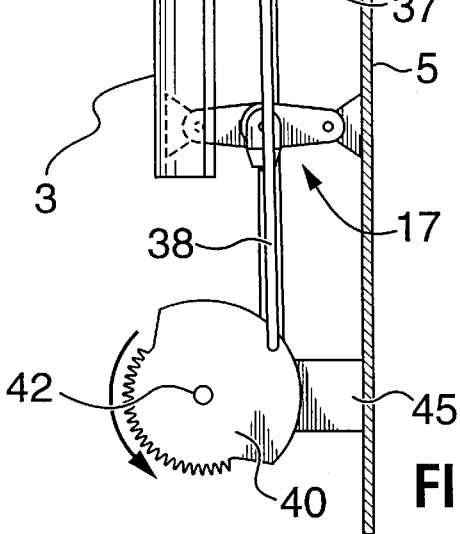
FIG. 4
FIG. 5
FIG. 6

ADJUSTABLE MIRROR

BACKGROUND OF THE INVENTION

This invention relates to an adjustable mirror, namely a mirror having a flexible mirror surface to permit variation in an image viewed in the mirror.

DISCUSSION OF THE RELATED ART

A number of flexible mirrors and mirror assemblies are known. For instance, U.S. Pat. No. 4,119,366 (Lemaitre) describes a mirror with a variable focal distance in which a reflective surface is bent elastically by applying thereto a distributed load or an axial load and balancing this load by a central or peripheral bearing pressure. U.S. Pat. No. 4,280,753 (Neubauer) describes a mirror assembly capable of continuous flexing or undulating and constructed of a flexible sheet material having a reflective surface. The flexible mirror device disclosed in U.S. Pat. No. 4,575,200 (Humiston) includes a frame with parallel frame members having a flexible mirror mounted thereon. A longitudinal and a transverse rotatable shaft are mounted between frame members and rotation thereof effects change in the curvature of the mirror.

U.S. Pat. No. 3,445,157 (Zitter) describes a manually operated distorting toy mirror, comprising a flexible mirror sheet mounted in a frame and a plurality of spaced transverse elongated elements mounted in slots in the frame, which can be twisted to increase or decrease the degree of curvature of the flexible mirror.

Furthermore, U.S. Pat. No. 5,835,292 (Pickett et al) teaches a mirror apparatus including a flexible mirror mounted in a frame and a shuttle assembly shiftable along a generally upright axis and having a cam element for selectively engaging a cam follower coupled with the rear face of the mirror to flex the mirror outwardly.

However, none of the various flexible mirror arrangements of the prior art affords a fully incremental adjustment of a mirror surface in all different directions to facilitate an unlimited range of slight modifications in the distortion or variation OF an image as seen in the mirror.

SUMMARY OF THE INVENTION

The present invention provides an adjustable mirror device comprising:

- a flexible mirror element mounted in a frame and having a mirrored front surface and a rear surface;
- said frame having a back plate and a peripheral portion which frames said mirror element;
- a plurality of adjustment elements having portions secured at spaced locations to the rear surface of the mirror and to the surface of said back plate;
- a plurality of control means disposed on said frame and operatively connected to each of said adjustment elements,
- whereby actuation of one or more of said control means effects concomitant lateral movement of the respective adjustment element to cause flexing of the mirror element in one or more desired locations so as to vary the contour of the mirrored front surface of the mirror element and hence an image received therefrom.

Advantageously, each said control means comprises a pair of adjuster wheels mounted in the frame, each adjuster wheels being incrementally rotatable to cause concomitant lateral movement of the associated adjustment element resulting in a desired flexing or relaxing of the mirror element to vary the contour of the mirrored front surface thereof to achieve a desired or random variation in an image observed in the mirror element. In one embodiment, each adjustment element comprises a pair of arms pivotally mounted at the lower ends thereof about a common axis. The upper ends of the arms are attached respectively to the rear surface of the mirror element and the adjacent surface of the back plate, whereby rotation of one of the adjuster wheels causes expansion or retraction of the arms of the associated adjustment element to increase or decrease the distance between the frame back plate and the flexible mirror element to achieve a variation in the contour of the flexible mirror element, for instance to a concave, convex or vertically or laterally curved configuration to achieve a "fat", "thin", "tall" or "short" image of a person looking into the mirror.

BRIEF DESCRIPTION OF THE DRAWINGS

Embodiments of the invention will be described, by way of example, with reference to the accompanying drawings, in which:

FIG. 2 is a partial right side sectional view of the mirror of FIG. 1, taken along line II—II of FIG. 1;

FIG. 3 is a top sectional view, taken along line III—III of FIG. 1;

FIG. 4 is a right side sectional view, similar to FIG. 2, but with the mirror flexed to a concave configuration;

FIG. 5 is a right side sectional view, similar to FIGS. 2 and 4, but with the mirror flexed to a convex configuration;

FIG. 6 is a right side view, partly in section, of the mirror of FIG. 1, but with the mirror flexed into an outwardly curved configuration;

DETAILED DESCRIPTION OF THE PREFERRED EMBODIMENT

Figure 1:
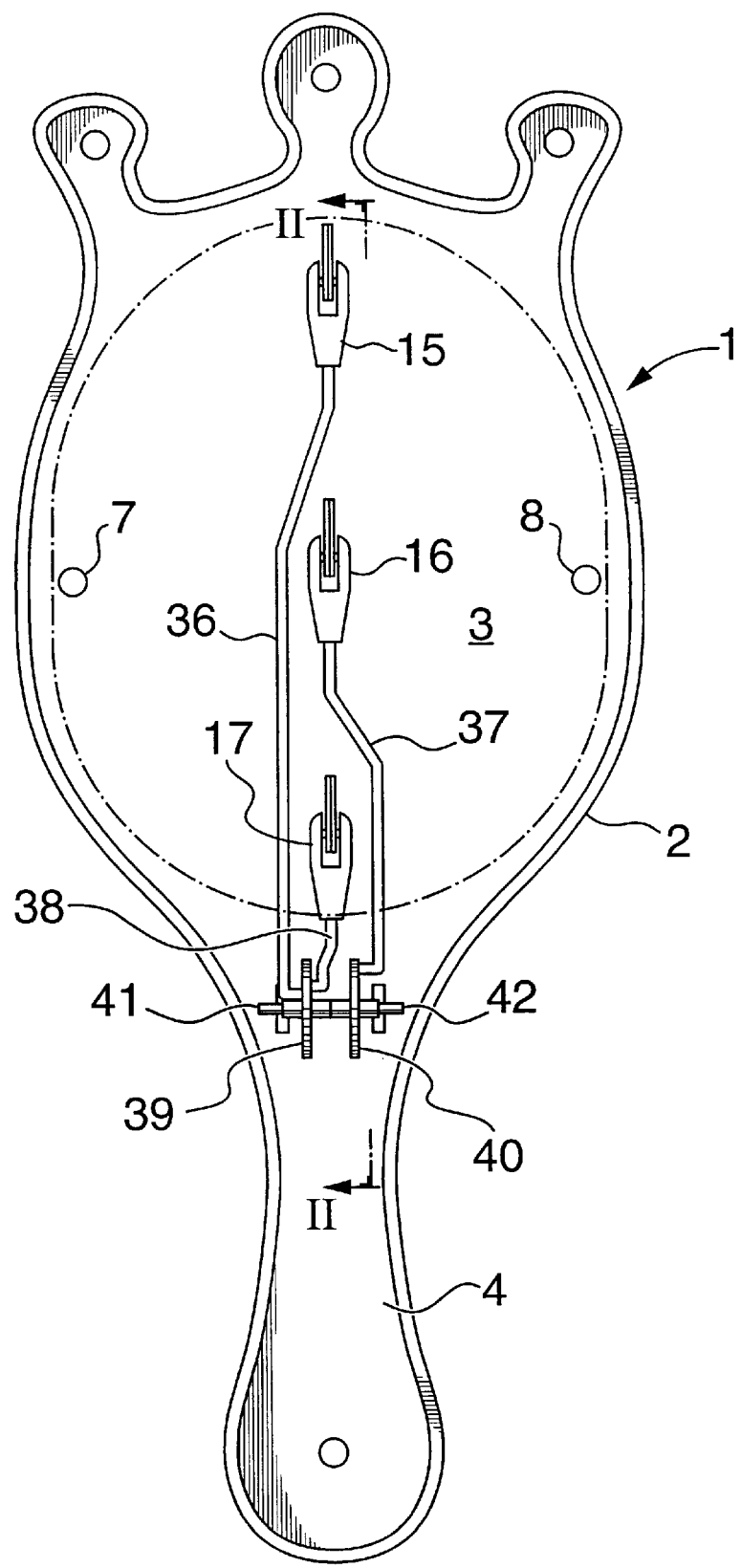
FIG. 1 is a front view of an adjustable mirror according to an embodiment of the invention, taken along line I—I of FIG. 2.

Referring now to the drawings, FIGS. 1 to 3 show a preferred embodiment of an adjustable mirror 1 comprising a frame 2 with a generally oval flexible mirror element 3 mounted therein. The frame 2 is provided at a lower end with a handle 4. Behind the frame 2 is positioned a back plate 5 which is parallel to and spaced from the flexible mirror element 3 (when the element 3 is in a plane configuration displaying a normal image). The back plate 5 is also generally oval in shape and curves inwardly at the peripheral flange portion 6 thereof to merge with the periphery of the frame 2.

The mirror 3 is mounted in spaced parallel relation to the back plate 5 by means of mounting bolts 7 and 8 located on each side of the back plate 5 at the middle thereof. As seen in FIG. 3, the bolts 7 and a are screwed into sleeves 9 and 10 and pass through holes 11 and 12 in the sides of the mirror element 3. The bolts 7 and 8, and hence the mirror element 3, are movable by virtue of the provision of springs 13 and 14 which are coaxial with the bolts 7 and 8, respectively, and permit a range of movement of the mirror element 3 in relation to the frame 2 and back plate 5.

Located behind the flexible mirror element 3 are a plurality of mirror adjusters 15, 16 and 17, each comprising a pair of arms 18, 19 of adjuster 15, 20, 21 of adjuster 16 and 22, 23 of adjuster 17. Each pair of arms is pivotable at its lower ends about a common axle 24, 25, 26, respectively, of a connector 27, 28, 29, respectively. Secured to the back of the flexible mirror element 3 are fastener elements 30, 31 and 32, while fastener elements 33, 34 and 35 are secured to the inside surface of the back plate 5 in substantially corresponding locations. The distal ends of the arms 18, 19 and 20 are each connected pivotally to the fastener elements 30, 31 and 32, respectively. Similarly, the distal ends of the arms 21, 22, 23 are each connected pivotally to the fastener elements 33, 34 and 35, respectively.

Attached to the bottom of each mirror adjuster 15, 16, 17 is a connecting rod 36, 37, 38, respectively, which rods extend downwardly between the flexible mirror element 3 and the back plate 5 to the area where the frame 2 merges into the handle 4. Located in that area are disc-shaped control dials 39 and 40, which function as adjuster wheels, mounted on axles 41 and 42 which have a common rotational axis. Connecting rods 36 and 38 are pivotally attached to a rear peripheral portion of control dial 41, while connecting rod 37 is pivotally attached to a rear peripheral portion of control dial 42. The front peripheral portions of the control dials 39 and 40 are convexly curved and formed with a knurled or serrated friction surface 43 and 44, respectively, to facilitate incremental rotation of a control dial, as desired. The control dials 39 and 40 are mounted on the back plate 5 by means of brackets 45.

In operation of the adjustable mirror 1, the friction surface 43 or 44, or both thereof, is manually moved up or down, usually by means of a finger of a user, to rotate the control dial 39, 40, respectively and thereby effect concomitant upward or downward movement of the associated connection rods 36 and 38, or of the connecting rod 37. This upward or downward movement has the effect of equivalent movement of the respective mirror adjuster 15, 16 or 17, which, in turn, causes the associated pair of arms 18, 19 or 20, 21 or 22, 23 of the mirror adjuster 15, 16 or 17, respectively, to open or close and, hence, cause an adjacent portion of the flexible mirror element 3 to move forward or backward with respect to its orientation to the back plate 5, and to result in a flexing or bending of the flexible mirror element to create a mirror image surface of the flexible mirror element having a concave, convex or curved configuration, with concomitant variation or distortion of an image seen by a user, as discussed in more detail below.

FIG. 2 shows a side view of the adjustable mirror of the invention with the flexible mirror element 3 in a plane configuration and parallel to the back plate 5. This permits the viewing of a normal image in the flexible mirror 3. In this configuration, the mirror adjusters 15, 16 and 17 are similarly configured, with the arms 18, 20 and 22 disposed at an approximately 60° angle to the associated arms 19, 21 and 23. In turn, the control dials 39 and 40 are each in an intermediate position, with the friction surfaces 43 and 44 neither raised nor lowered.

Turning now to FIG. 4, the flexible mirror element has been adjusted to a concave configuration by moving the friction surface 43 of control dial 39 in a downward direction to cause connecting rods 36 and 38 to move upwardly, so as to open up arms 18 and 19, on the one hand, and 22 and 23 on the other hand, to fully extend the respective pairs of arms so that arms 18 and 19 are mutually parallel, i.e. at an angle of 180° to each other. This outward movement causes the top and bottom of the flexible mirror element 3 to be moved outwardly, away from the plane of the normal position of the flexible mirror element and further from the back plate 5. At the same time, the control dial 40 is left untouched in the intermediate position and the connecting rod 37 likewise does not move, so that the mirror adjuster 16 remains in the normal configuration with the arms 20 and 21 thereof in the approximately 60° orientation. Thus, the middle of the flexible mirror element remains in the normal position. The overall effect is to move the top and bottom of the flexible mirror element in a leftward direction, as seen in FIG. 4, to create a curved or concave mirror effect, which gives rise to a tall image. The actual degree of curvature is somewhat exaggerated in FIG. 4 for reasons of clarity.

Figure 7:
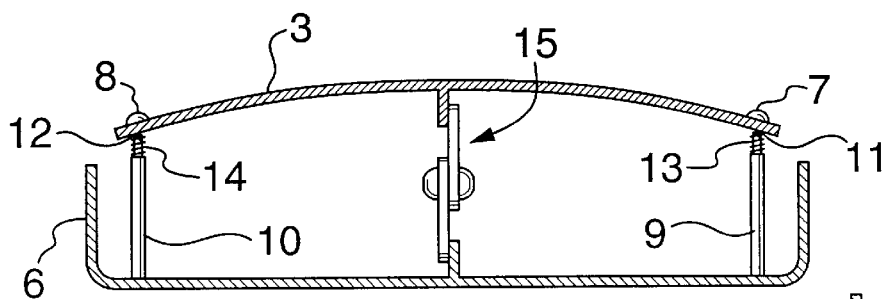
FIG. 7 is a top sectional view of the mirror configuration shown in FIG. 6.

Other variations of the configuration of the flexible mirror element can be achieved by various different combinations of movement of the connecting rods and, hence, the mirror adjusters, so as to vary the angle between pairs of arms 18, 19, and 20, 21 and 22, 23, resulting in various flexing and relaxing of the flexible mirror surface as shown in FIG. 5, which exhibits a convex configuration, FIG. 6 which has a vertically convexly curved configuration (as best seen in FIG. 7) with the sleeves 9 and 10 and springs 13 and 14 maintaining the side edges of the flexible mirror element approximately in the normal orientation, while the arms 18 to 23 of the mirror adjusters 15 to 17 are all extended at the maximum position. This results in a thin image as seen in the flexible mirror element 3.

Figure 8:
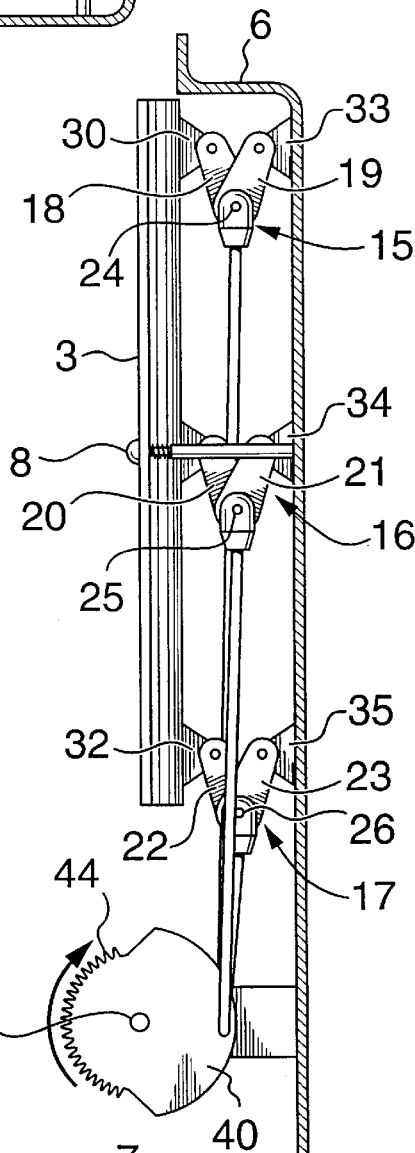
FIGS. 8 and 9 are, respectively, a right side view and top sectional view of the mirror flexed into an inwardly curved configuration.
Figure 9:
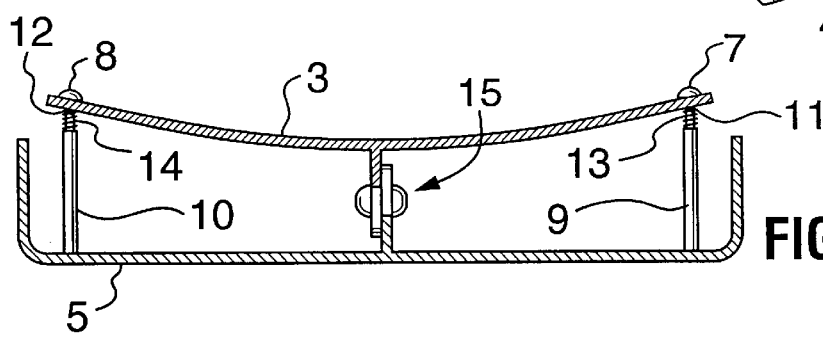

Similarly, FIGS. 8 and 9 show the reverse situation, with the arms 18 to 23 of the three mirror adjusters 15 to 17 in the contracted configuration by pushing up on the friction surfaces 43 and 44 of the control dials 39 and 40. This gives rise to a fat image in the flexible mirror element.

Thus, in summary pushing down on control dial 39 displays a tall image, pushing up on control dial 39 displays a short image, pushing down on control dial 40 displays a thin image, and pushing up on control dial 40 displays a fat image.

Figure 10:
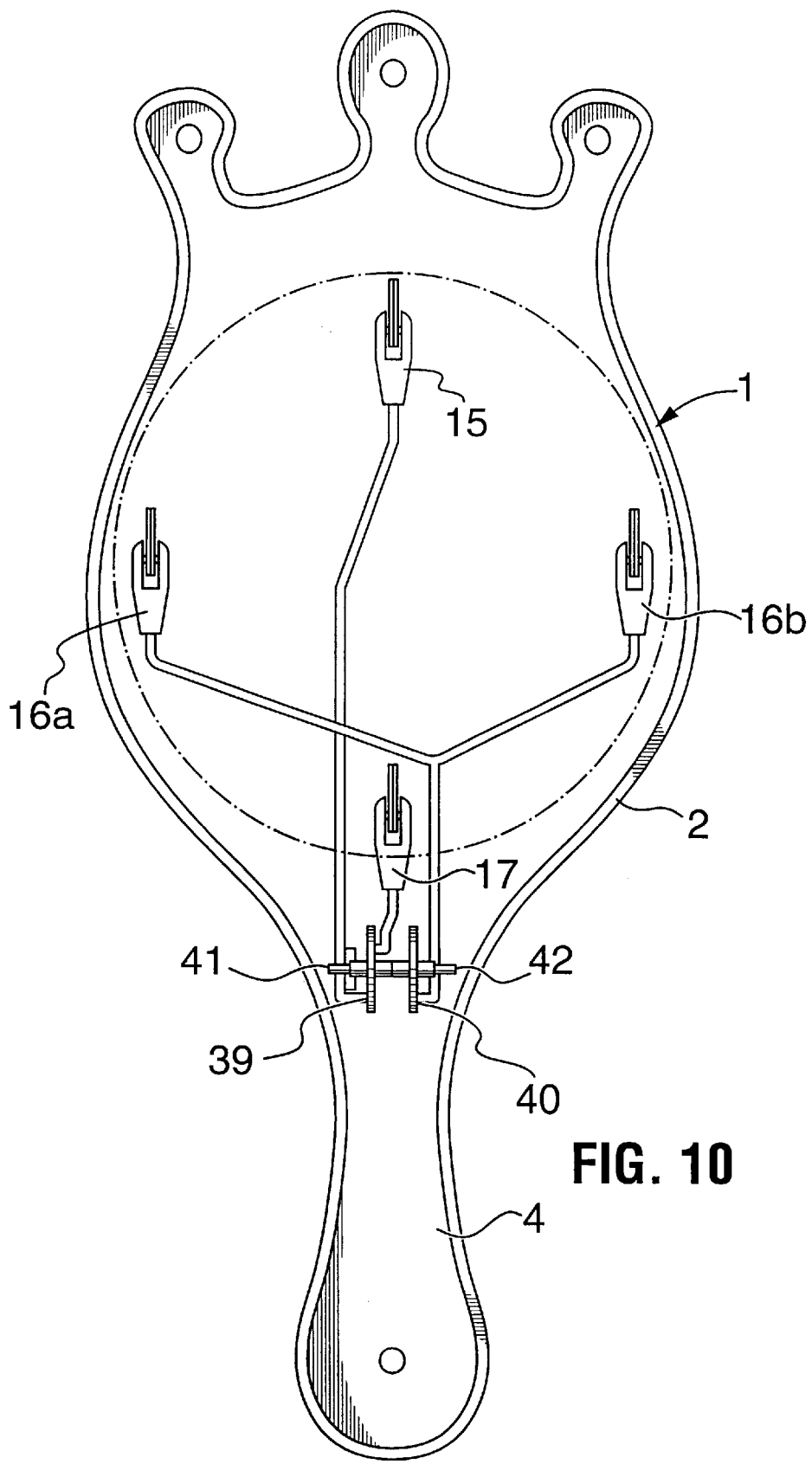
FIG. 10 is a front view of another embodiment of adjustable mirror.

Furthermore, referring to FIG. 10, a modified arrangement is shown with a total of four mirror adjusters 15, 17, 16a and 16b with the adjusters 16a and 16b being disposed one each side of the flexible mirror element. Appropriate adjustment of the friction surfaces 43 and 44 on the control dials 39 and 40 results in flexing of all four edges of the flexible mirror element to achieve degrees of concavity or convexity as desired.

The flexible mirror element 3 may itself exhibit a degree of resiliency or springiness such that, upon releasing the friction surface 43 or 44 (from thumb or finger contact) the natural springiness of the flexible mirror element 3 automatically restores it to the plane configuration shown in FIG. 2, thereby restoring the normal image.

Alternately, the flexible mirror element 3 can be less springy and require a positive external force from the fastener element 30, 31 or 32 to push or pull the mirror back to the plane configuration. To achieve this, the control dials 39 and 40 may be spring biased, so that movement of the friction surface 43 or 44 in an upward or downward direction will result in flexing or relaxation of the flexible mirror element to achieve a modified or distorted image, while removal of thumb or finger contact with the friction surface 43 or 44 would result in a return of the control dial 39, 40 to the intermediate base position resulting in reversion of the flexible mirror element to the plane configuration. In a more sophisticated arrangement, register points can be established on the control dials, for example by calibrating the dial with a numbered or indexed peripheral scale thereon, so that favourite images can be noted on the scale and revisited as desired at future instances.

What is claimed is:

1. An adjustable mirror device comprising:

a flexible mirror element mounted in a frame and having a mirrored front surface and a rear surface;

said frame having a back plate and a peripheral portion which frames said mirror element;

a plurality of adjustment elements having portions secured at spaced locations to the rear surface of the mirror and to the surface of said back plate;

a plurality of manually operable control means disposed on said frame and operatively connected to each of said adjustment elements, whereby actuation of one or more of said control means effects concomitant lateral movement of the respective adjustment element to cause flexing of the mirror element in one or more desired locations so as to vary the contour of the mirrored front surface of the mirror element and hence an image received therefrom.

2. An adjustable mirror device according to claim 1, wherein each said control means comprises an adjuster wheel mounted in said frame, each said adjuster wheel being incrementally rotatable to cause concomitant lateral movement of the associated adjustment element resulting in a desired flexing or relaxing of the mirror element to vary the contour of the mirrored front surface thereof to achieve a desired or random variation in an image observed in said mirror element.

3. An adjustable mirror device according to claim 2, wherein each adjustment element comprises a pair of arms pivotally mounted at the lower ends thereof about a common axis, the upper ends of said arms being attached respectively to the rear surface of said mirror element and the adjacent surface of said back plate, whereby rotation of one said adjuster wheel causes expansion or retraction of the arms of the associated adjustment element to increase or decrease the distance between the frame back plate and the flexible mirror element.

4. An adjustable mirror device according to claim 3, wherein each adjuster wheel is connected to the associated adjustment element by means of a connecting rod, such that rotation of an adjuster wheel causes upward or downward movement of the associated connecting rod to effect expansion or retraction of the arms of the associated adjustment element.

5. An adjustable mirror device according to claim 1, including first and second adjustment elements located behind a lower and an upper portion, respectively, of the flexible mirror element on a central axis thereof, both said first and second adjustment elements being operatively connected to one said control means, and a third adjustment element located behind a central portion of said flexible mirror element on the central axis thereof and operatively connected to another of said control means.

6. An adjustable mirror device according to claim 1, including first and second adjustment elements located behind a lower and an upper portion, respectively, of the flexible mirror element on a central axis thereof, both said first and second adjustment elements being operatively connected to one said control means, and third and fourth adjustment elements located behind said flexible mirror element adjacent the sides thereof.

7. An adjustable mirror device according to claim 2, wherein a front peripheral portion of each adjuster wheel is formed with a knurled or serrated surface to facilitate manual control of the adjuster wheel.

8. An adjustable mirror device according to claim 3, wherein a front peripheral portion of each adjuster wheel is formed with a knurled or serrated surface to facilitate manual control of the adjuster wheel.

9. An adjustable mirror device according to claim 4, wherein a front peripheral portion of each adjuster wheel is formed with a knurled or serrated surface to facilitate manual control of the adjuster wheel.

10. An adjustable mirror device according to claim 5, wherein a front peripheral portion of each adjuster wheel is formed with a knurled or serrated surface to facilitate manual control of the adjuster wheel.

11. An adjustable mirror device according to claim 6, wherein a front peripheral portion of each adjuster wheel is formed with a knurled or serrated surface to facilitate manual control of the adjuster wheel.

12. An adjustable mirror device according to claim 1, wherein the frame is provided with a downwardly extending handle portion and the control means are located below the flexible mirror element at the commencement of said handle portion.

* * * * *